United States Patent [19]

Jeon

[11] Patent Number: 5,742,383
[45] Date of Patent: Apr. 21, 1998

[54] APPARATUS FOR MEASURING DEGREE OF INCLINATION OF OBJECTIVE LENS FOR OPTICAL PICKUP

[75] Inventor: Byeonghwan Jeon, Kyungki-do, Rep. of Korea

[73] Assignee: Samsung Electronics Co., Ltd., Suwon, Rep. of Korea

[21] Appl. No.: 756,642

[22] Filed: Nov. 26, 1996

[51] Int. Cl.⁶ ............................. G01B 11/26; G01C 1/00
[52] U.S. Cl. ................................. 356/138; 250/201.5
[58] Field of Search ........................ 356/138, 139.05, 356/139.06, 139.07, 139.08, 139.1, 152.1, 152.2, 152.3, 375, 373, 150, 153, 154; 369/44.21, 44.19, 44.41, 44.28, 44.11, 44.12, 112, 110, 13, 824, 211, 618, 629, 639, 640, 831, 833–837; 250/201.5, 201.7, 201.8, 205, 207, 217, 221, 224, 225, 230, 231, 236

[56] References Cited

U.S. PATENT DOCUMENTS

| | | | |
|---|---|---|---|
| 3,601,613 | 8/1971 | Hock | 250/205 |
| 4,502,783 | 3/1985 | Lau et al. | 356/152 |
| 4,650,298 | 3/1987 | Katoh et al. | 350/602 |
| 5,410,532 | 4/1995 | Ohno et al. | 369/112 |
| 5,559,639 | 9/1996 | Nakagishi et al. | 359/823 |

FOREIGN PATENT DOCUMENTS

| | | |
|---|---|---|
| 28 10 025 | 9/1978 | Germany . |
| 41 35 959 | 5/1993 | Germany . |

*Primary Examiner*—Frank G. Font
*Assistant Examiner*—Michael P. Stafira
*Attorney, Agent, or Firm*—Burns, Doane, Swecker & Mathis, L.L.P.

[57] ABSTRACT

An apparatus for measuring the degree of inclination of an objective lens for an optical pickup is provided. The apparatus for measuring the degree of inclination of the objective lens includes a light source, a collimator positioned between the light source and the objective lens, for collimating light emitted from the light source, a condensing lens for converging light passed through the collimator on the objective lens, a light receiving element for receiving light passed through the condensing lens after being reflected from the objective lens, and an optical path converting portion positioned along the optical path between the collimator and the condensing lens, for directing part of the light entering the optical path converting portion from the light source to travel toward the condensing lens and directing the remaining light toward the light receiving element, wherein a difference between the location of the light directly entering the light receiving element after being emitted from the optical path converting portion and the location of the light entering the light receiving element after being reflected from the objective lens is detected to measure the degree of inclination of the objective lens.

6 Claims, 3 Drawing Sheets

APPARATUS FOR MEASURING DEGREE OF INCLINATION OF OBJECTIVE LENS FOR OPTICAL PICKUP

BACKGROUND OF THE INVENTION

The present invention relates to an apparatus for measuring the degree of inclination of an objective lens for an optical pickup, and more particularly, to an apparatus for measuring the degree of inclination of an objective lens for an optical pickup which can measure and correct the inclination of the objective lens using a laser beam and a charge-coupled device (CCD).

Generally, information recorded on a recording medium in a compact disk player (CDP), a video optical driver (VOD) or a laser disk player (LDP) is read using an optical pickup. The optical pickup includes a light source, an objective lens for converging light emitted from the light source, and a photodetector for detecting an error signal and an information signal by receiving light reflected from the optical recording medium.

The objective lens is driven by an actuator according to a focusing error signal or a tracking error signal detected by the photodetector.

The size of a pit or a magnetic domain representing signal information recorded on the recording medium are in micrometer units. Thus, in order to precisely converge light emitted from the light source on a desired position of the recording medium, the objective lens must be positioned appropriately with respect to the path of light emitted from the light source.

To this end, the objective lens must be precisely controlled when mounting the objective lens on the actuator. According to the prior art, the degree of inclination of the objective lens is measured using an apparatus for measuring the degree of inclination of the objective lens for an optical pickup as shown in FIG. 1.

The apparatus for measuring the degree of inclination of the objective lens for the optical pickup includes a light source 1, a fluorescent screen 3 and a reflecting mirror 5. Here, an objective lens 10 for an optical pickup is fixed on an actuator 13 for correcting the position of the objective lens according to a detected error signal. The objective lens 10 includes a convex portion 11 for converging light at the center thereof and a planar portion 12 for measuring the degree of inclination around the periphery of the convex portion 11. The apparatus for measuring the degree of inclination of the objective lens for the optical pickup adopts a coherent and straight laser beam having high emitting power as a light source 1. A light beam 2 emitted from the light source 1 is incident on the planar portion 12 of the objective lens. Here, if a central axis of the objective lens 10 is parallel to the optical path of the light 2 emitted from the light source 1, the path of the light 2 incident on the planar portion 12 and a light beam 4 reflected from the planar portion 12 coincide with each other. However, if the objective lens 10 is not aligned with respect to the traveling direction of the light beam 2 emitted from the light source 1, the light beam 4 reflected by the planar portion 12 of the objective lens 10 has a different optical path from that of the incident beam 2.

A fluorescent screen 3 receives the light beam 4 reflected from the objective lens 10 in which the light receiving portion thereof has a different brightness at peripheral portion thereof. The fluorescent screen 3 is positioned along the optical path to receive the light beam 4 reflected from the planar portion 12 of the objective lens 10, and a reference location of the fluorescent screen 3 is set based on the case where the optical paths of the lights incident on and reflected from the planar portion 12 are the same.

The location of a visible light spot formed on the fluorescent screen 3 is visually checked and then it is determined whether the error is within an allowable error range with respect to the above reference location. Here, if the determined error is within the allowable error range, the objective lens is graded superior. Otherwise, the objective lens is graded inferior and then the inclination of the objective lens is readjusted.

According to the conventional apparatus for measuring the degree of inclination of the objective lens for the optical pickup, since the degree of inclination of the objective lens is visually measured, an error in observation may occur and much time is required for the visual observation.

SUMMARY OF THE INVENTION

To solve the above problems, it is an object of the present invention to provide an apparatus for measuring the degree of inclination of an objective lens for an optical pickup, which can quickly and accurately measure the degree of inclination of the objective lens for the optical pickup.

To achieve the above object, there is provided an apparatus for measuring the degree of inclination of an objective lens for an optical pickup comprising: a light source; a collimator positioned between the light source and the objective lens, for collimating light emitted from the light source; a condensing lens for converging light passed through the collimator on the objective lens; a light receiving element for receiving light passed through the condensing lens after being reflected from the objective lens; and optical path converting means positioned along the optical path between the collimator and the condensing lens, for directing part of the light entering the optical path converting means from the light source to travel toward the condensing lens and directing the remaining light toward the light receiving element, wherein a difference between the location of the light directly entering the light receiving element after being emitted from the light source and the location of the light entering the light receiving element after being reflected from the objective lens is detected to measure the degree of inclination of the objective lens.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
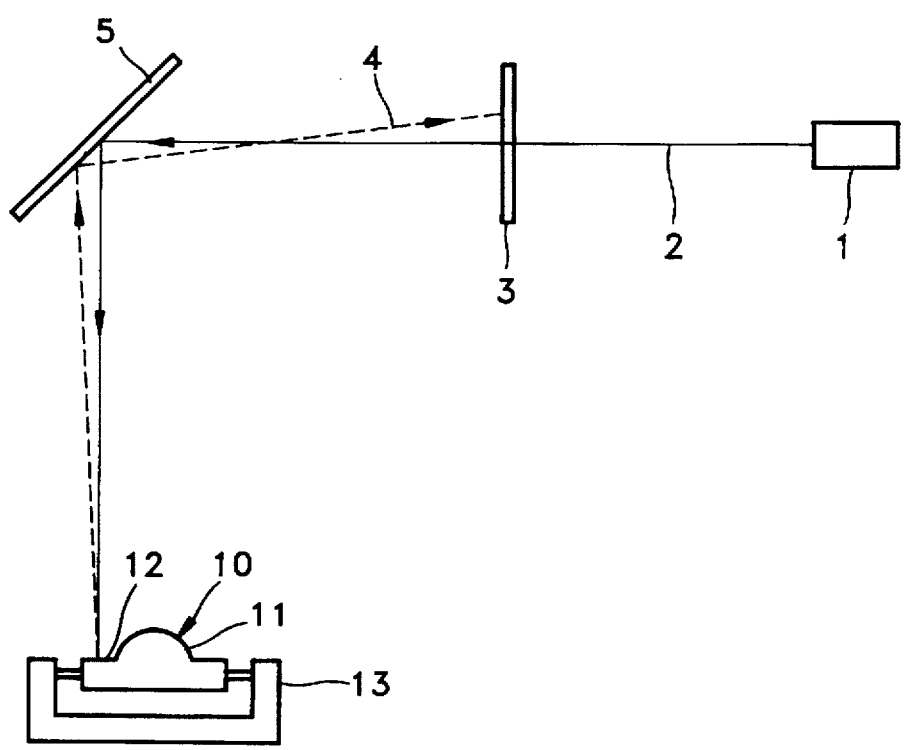
FIG. 1 is a schematic diagram illustrating the optical arrangement of a conventional apparatus for measuring the degree of inclination of an objective lens for an optical pickup.
Figure 2:
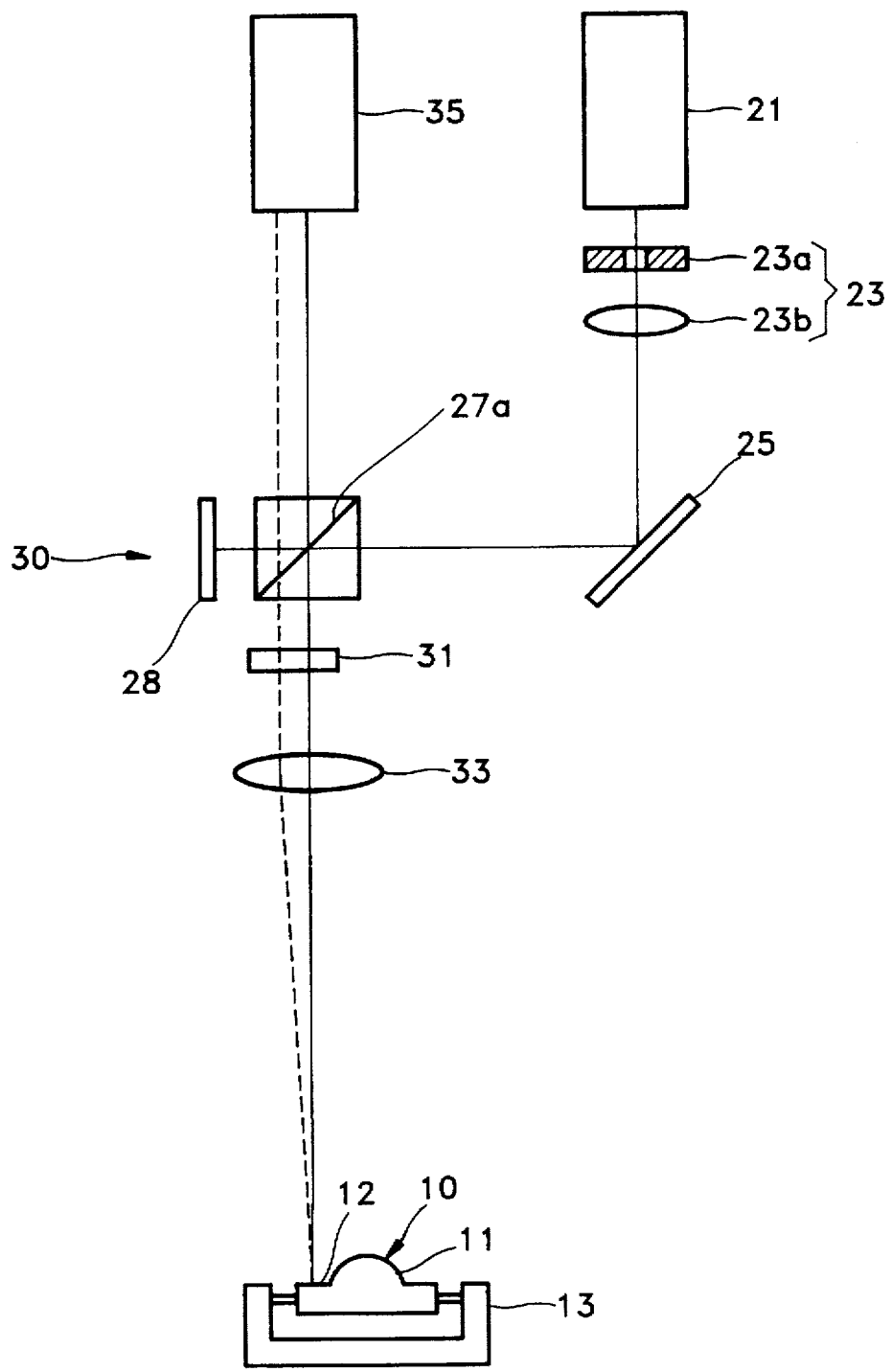
FIG. 2 is a schematic diagram illustrating the optical arrangement of an apparatus for measuring the degree of inclination of an objective lens for an optical pickup according to a preferred embodiment of the present invention.

Referring to FIG. 2, an apparatus for measuring the degree of inclination of an objective lens for an optical pickup according to a preferred embodiment of the present invention includes a light source 21, a collimator 23, a condensing lens 33, a light receiving element 35 and optical path converting means 30.

The light source 21 is a coherent and straight laser beam having high emitting power. For the light source 21, any laser can be used, however, preferably, a semiconductor laser which consumes relative little power is used.

The collimator 23 is positioned along an optical path of the light source 21 and includes at least one pin hole 23a and a collimating lens 23b which are for blocking divergent beams emitted from the light source 21 and converging the divergent beams and collimating the converged beams, respectively.

The optical path converting means 30 is for converting the traveling path of the beam by transmitting and reflecting the incident beam. That is, part of the beam from the collimator 23 travels toward the light receiving element 35 and the remaining beam travels toward an objective lens 10.

Also, a reflecting mirror 25 may be further provided between the collimator 23 and the optical path converting means 30 depending on the optical arrangement of the apparatus for measuring the degree of inclination of the objective lens.

The objective lens 10 for the optical pickup includes a convex portion 11 for performing its original function and a planar portion 12 surrounding the convex portion 11, and is supported by an actuator 13.

The optical path converting means 30 includes a beam splitter 27 formed by joining two right angled prisms and a reflecting mirror 28 provided next to one side of the beam splitter 27. The beam splitter 27 transmits and reflects the beam incident at the boundary surface 27a of the two right angled prisms. The beam reflected by the boundary surface 27a travels toward the condensing lens 33, and the beam transmitted through the boundary surface 27a travels toward the reflecting mirror 28 to be completely reflected back to the beam splitter 27 and then is reflected from the boundary surface 27a to travel toward the light receiving element 35.

The condensing lens 33 converges the collimated and reflected beam onto the planar portion 12 of the objective lens 10 for the optical pickup. Also, the condensing lens 33 collimates the reflected beam from the planar portion 12 of the objective lens 10 into a parallel beam.

In order to eliminate the effects of different reflective indexes, caused by various wavelengths of the beam incident on the objective lens 10, on a signal detected by the light receiving element 35, a filter 31 for transmitting only a predetermined wavelength of beam may be further provided along the optical path between the condensing lens 33 and the beam splitter 27. Also, the filter 31 may be formed integrally with the condensing lens 33 by being coated on one side of the condensing lens 33.

In the light receiving element 35, a location of light directly incident on the light receiving element 35, but not via the objective lens 10, is set as a reference location with respect to the expected location of light incident thereon via the objective lens 10. Also, the light receiving element 35 compares the location of light, which is received by the light receiving element 35 via the beam splitter 27 after being incident on the planar portion 12 of the objective lens 10 via the condensing lens 33 and reflected from the planar portion 12, with the reference location. Preferably, the light receiving element 35 is a charge-coupled device (CCD).

If the difference between the location of the light received by the light receiving element 33 via the objective lens 10 for the optical pickup and the reference location is within an allowable error range, the degree of inclination of the objective lens 10 is graded superior. Otherwise, the degree of inclination of the objective lens 10 is graded inferior. It is preferable that the light emitted from the light source 21 is a visible ray in order to visually determine the location of the light received by the light receiving element 35.

Figure 3:
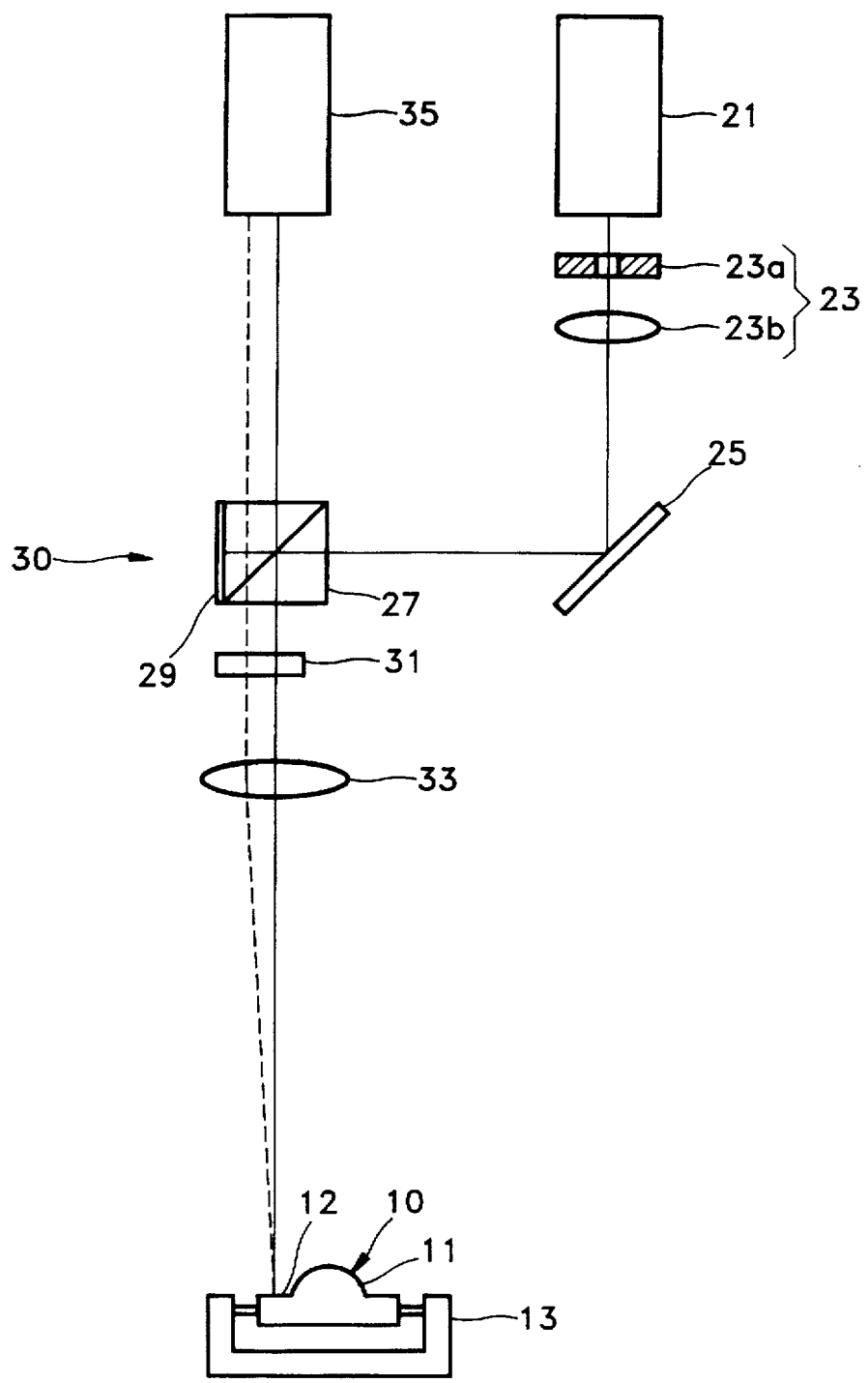
FIG. 3 is a schematic diagram illustrating the optical arrangement of an apparatus for measuring the degree of inclination of an objective lens for an optical pickup according to another preferred embodiment of the present invention.

FIG. 3 is a schematic diagram illustrating the optical arrangement of an apparatus for measuring the degree of inclination of the objective lens according to another preferred embodiment of the present invention. As shown in FIG. 3, the apparatus for measuring the degree of inclination of the objective lens includes a light source 21, a collimator 23, a condensing lens 33, a light receiving element 35 and an optical path converting means 30. Here, reference numerals which are the same as those of FIG. 2 represent the same elements as those of FIG. 2, and accordingly detailed description of the same elements will be omitted.

According to the second embodiment, the structure of the optical path converting means 30 is simplified. That is, the optical path converting means 30 includes a beam splitter 27 and a reflecting mirror 29. Here, the reflecting mirror 29 is integrally formed at one side of the beam splitter 27 to reflect part of the beam entered via the collimator 23. As described above, the structure of the apparatus for measuring the degree of inclination of the objective lens can be simplified by integrally forming the beam splitter 27 and the reflecting mirror 29. Thus, the optical path between the beam splitter 27 and the reflecting mirror 29 is shortened, thereby reducing light loss.

The parallel beam passing through the collimator 23 after being emitted from the light source 21 partially travels toward the light receiving element 35 by the optical path converting means 30, and the remaining beam travels toward the objective lens 10. The location of the light entering the light receiving element 35 after being reflected by the planar portion 12 of the objective lens 10 is compared with a reference location, wherein the location of the light directly entering the light receiving element 35 after being emitted from the light source 21 is set as the reference location. The degree of inclination of the objective lens 10 with respect to the actuator 13 can be measured based on the compared locations of light.

Also, the filter 31 of FIG. 2, as described in the above second embodiment, may be arranged along the optical path between the beam splitter 27 and the condensing lens 33, or coated on at least one side of the condensing lens 33.

Therefore, the degree of inclination of the objective lens for the optical pickup can be measured quickly and accurately, thereby adjusting the position of objective lenses improperly mounted on the actuator in the manufacturing process of the optical pickup.

What is claimed is:

1. An apparatus for measuring a degree of inclination of an objective lens for an optical pickup, comprising:

light source;

a collimator positioned between said light source and said objective lens, for collimating light emitted from said light source;

a condensing lens for converging light passed through said collimator on said objective lens;

a light receiving element for receiving light passed through said condensing lens and reflected from said objective lens; and optical path converting means positioned along the optical path between said collimator and said condensing lens, for directing part of the light entering said optical path converting means from said light source to travel toward said condensing lens and directing the remaining light toward said light receiving element, wherein a difference between the location of a light directly entering said light receiving element after being emitted from said optical converting means and a location of the light entering said light receiving element after being reflected from said objective lens is detected to measure the degree of inclination of said objective lens.

2. An apparatus for measuring the degree of inclination of an objective lens for an optical pickup as claimed in claim 1, wherein said optical path converting means comprises:

a beam splitter for transmitting part of the light entering said optical path converting means and reflecting the remaining light; and a reflecting mirror arranged next to said beam splitter, for reflecting the light passing through said beam splitter.

3. An apparatus for measuring the degree of inclination of an objective lens for an optical pickup as claimed in claim 1, wherein said optical path converting means comprises:

a beam splitter having one side coated with a reflecting material, for transmitting part of the light entering said optical path converting means, and reflecting the remaining light, said reflecting material reflecting said transmitted light.

4. An apparatus for measuring the degree of inclination of an objective lens for an optical pickup as claimed in claim 1, further comprising:

a filter positioned along an optical path between said optical path converting means and said condensing lens, for transmitting a visible range of said light and blocking the remaining ranges thereof.

5. An apparatus for measuring the degree of inclination of an objective lens for an optical pickup as claimed in claim 4, wherein said filter is coated on at least one side of said condensing lens.

6. An apparatus for measuring the degree of inclination of an objective lens for an optical pickup as claimed in claim 1, wherein the light emitted from said light source is in the visible spectrum.

\* \* \* \* \*